United States Patent [19]
Hothan

[11] 3,926,143
[45] Dec. 16, 1975

[54] LIQUID DETECTING GAUGE

[76] Inventor: Harold A. Hothan, 1445 E. Dexter St., Covina, Calif. 91724

[22] Filed: Aug. 16, 1974

[21] Appl. No.: 497,948

Related U.S. Application Data

[63] Continuation-in-part of Ser. No. 434,787, Jan. 21, 1974, abandoned.

[52] U.S. Cl. .............................. 116/118 R; 73/73
[51] Int. Cl.² ......................................... G01F 23/08
[58] Field of Search.......... 116/118 R; 73/319, 320, 73/322, 73, 305

[56] References Cited
UNITED STATES PATENTS

| | | | |
|---|---|---|---|
| 3,483,656 | 12/1969 | Baumann | 73/322 |
| 3,739,524 | 6/1973 | Rose | 116/118 R |

*Primary Examiner*—Richard C. Queisser
*Assistant Examiner*—Marcus S. Rasco
*Attorney, Agent, or Firm*—John H. Crowe

[57] ABSTRACT

A gauge designed to detect and give visual indication of the presence of free water at a predetermined depth in the ground. The gauge has a tubular housing in which is confined a spherical float with an attached float stem. The housing is a rigid tube enclosed at top and bottom by friction fitting caps, the bottom cap being distinguished by an upstanding flange which fits the tube tightly at its lower end and then diverges from the tube wall to form a gutter at the base of that wall. The spherical float is freely movable within the tube and the float stem extends upwardly from the float and through a guide hole at the center of the top cap. A rain cap is attached to the top of the stem and is sized to cover the space between the stem and guide hole to keep water from overhead sprinklers out of the housing.

The gauge is buried upright for use, with its top end exposed. When water is applied to the soil adjacent the gauge, the water soaks down into the ground until it reaches the gutter at the base of the tubular housing, and then flows into the gutter. The tubular wall of the housing has a number of holes near the bottom through which the water entering the gutter flows to form a rising column in the housing. This column carries the float upwardly, causing the stem to rise and signal water penetration of the soil to the depth of the gauge.

11 Claims, 3 Drawing Figures

LIQUID DETECTING GAUGE

CROSS-REFERENCE TO RELATED APPLICATION

This application is a continuation-in-part of my co-pending U.S. application Ser. No. 434,787, filed Jan. 21, 1974, now abandoned.

BACKGROUND OF THE INVENTION

This invention relates generally to soil moisture indicating gauges or devices, and more particularly to such a gauge or device capable of giving visual indication of the pentration of irrigation water to a predetermined soil depth.

The importance of proper watering of lawn, flower bed, and other areas as well known. Less well known, however, are methods to determine when the right amount of water has been added to the soil in such areas. Various articles have been published purportedly disclosing techniques for determining optimum sprinkling periods, intervals between such periods, etc., for different types of lawns, shrubbery, and the like, in areas of differing soil types and climactic conditions, but these articles have not completely solved the problem for the homeowner who wished to know how often, and for how long, he should apply water to his particular lawn, under his specific soil, climactic, etc., conditions. Practically all of the literature on the subject, at least to my knowledge, requires the homeowner to make certain assumptions about these factors, go to the trouble of measuring the rate of water delivery of his sprinker system with strategically placed collecting cans, and observe, by trial and error, the results of his conclusions bases on these assumptions and efforts. None of this is guaranteed to very accurately fix an individual's watering needs so that he probably more often than not applies either too much or too little water. Too little water is unsatisfactory for obvious reasons, and too much water is unsatisfactory because it deprives plants of oxygen from the soil (which has been driven from the interstices between the soil particles by the excess water) so that they begin to "drown", and results in wastage of water, a cardinal sin in the eyes of environmentalists, particularly where it occurs in places where local water is scarce and there are long periods without rain. Water wastage is of even more serious concern during periods of energy shortage in areas which require the pumping of water from long distances, such as, for example, certain areas in Southern California.

None of the above-mentioned ways of arriving at the watering needs of lawns, flower beds, and the like, provides for any method of determining and indicating when soil has been properly watered through evaluation of the moisture saturation of the soil itself. U.S. Pat. No. 2,740,371 to Nelson purports to do something of this sort by means of a "signalling device for lawn sprinklers," which includes a rod positioned partially coaxially within a tube, which tube is adapted to be pushed into the ground to a predetermined depth for use. At its upper end, the rod is connected, through an appropriate linkage system, to a spring-loaded second rod carrying a flag at its upper end. The tube has a pair of diametrically opposite openings in its wall, adapted to receive opposite edges of a tablet of material "which will rapidly disintegrte or dissolve in the presence of water." To prepare the Nelson device for use, a tablet of such material is positioned in the tube so as to be supported within the tube by means of the two openings in its side wall and with the first rod resting thereon. With the first rod thus supported by the tablet, the second rod and the flag at its outer end are held parallel to the ground against the pressure of a spring in the spring-loaded mechanism interconnecting the first and second rods, when the tube is positioned for use, this being accomplished by forcing said tube into the ground a predetermined distance so that the tablet is at a depth representative of the watering needs of the surrounding soil when penetrated by irrigation water. The device functions to signal water penetration of the soil to the desired depth by flipping the flag and its support rod to an upright position when the penetrating water causes the tablet to dissolve or disintegrate and allow the spring to force the first rod downwardly and urge the second rod to said upright position.

While the Nelson device might perform its function well enough, there are certain disadvantages to its use. For one thing, most of the mechanism of the device is exposed above ground where it would obviously interfere with mowing if positioned in a lawn. In the latter event, consequently, the device could not be left in place between periods of watering, unless the lawn cover happened to be of a type requiring little or no mowing (an extremely rare, if not nonexistent, state of affairs). Moreover, there are other reasons why the Nelson device cannot be simply implanted, and left indefinitely, at a particular spot in a lawn or flower bed, namely, its rather bizarre appearance, which could detract from the beauty and symmetry of a well-kept lawn, and the fact that the device must be reloaded with a water soluble tablet between periods of use. Such reloading, of course, requires removal of the apparatus from the ground to permit insertion of the tablet between the opening in the side wall of the tube.

SUMMARY OF THE INVENTION

I have now, by this invention, provided means for determining and visually indicating when the proper amount of water has been added to lawn, garden, etc., soil being sprinkled or otherwise watered. I accomplish these purposes with a novel moisture-sensing and indicating gauge or device of simple construction which is easy to install and use. Briefly, the gauge, in its preferred form, comprises a tubular housing and a float, with a lightweight stem attached, adapted to slide loosely within the housing. The tubular housing is enclosed at its top and bottom, the bottom closure being a cap shaped to provide a gutter at the base of the gauge, and the top closure being a cap with a top surface that slopes downwardly from a central opening toward a peripheral edge. There are openings around the base of the tubular housing wall leading to the interior of the housing from said gutter, and there is a central opening in the bottom closure of smaller cross-sectional area than the combined areas of the openings in the housing wall. Preferably, the float is of spherical shape and the light-weight stem is affixed to the float so as to extend radially away therefrom and is sized to fit loosely through the opening in the top closure. The float normally rests on the bottom of the tubular housing when the gauge is positioned for use, and the stem is of a length to extend only slightly above the top of the housing when the gauge is so positioned.

The novel gauge of this invention is positioned for use in a lawn, flower bed, or the like, by implanting it vertically in the ground, normally at a depth such that substantially only its top is exposed. The length of the tubular housing will preferably correspond to the desired depth of water penetration, from sprinkling or other irrigation, in the soil, so that, as will be seen, the device can be buried to this depth with minimal aboveground exposure. Preferably the lightweight float stem has a "rain" cap on its upper end which extends over the clearance space between the stem and the opening in the top closure of the housing, to prevent the entry of water from sprinklers or rain into the housing. The top portion of said stem is normally deposited within the housing where it cannot be seen from above, but has a brightly colored surface which serves as a moisture indicator in the below-described manner. When the gauge is buried for use, it projects such a low profile above the surface of the ground that a lawn mower can pass freely over it. Consequently, there is no necessity for removing the gauge from its position prior to mowing, is in the case of the aforesaid Nelson device. Also, the barely exposed top of the gauge is hardly noticable, particularly in a lush carpet of lawn. Moreover, even where it can be plainly seen, the gauge presents no discordant appearance to spoil the attractiveness of a well-kept lawn or neatly tended flower garden.

When an area implanted with my novel moisture gauge receives water from sprinklers, or any other source, the water penetrates into the ground slowly, saturating each soil particle as it goes. It is a known fact that water penetrates substantially straight down into soil, saturating it in ever deepening layers but with very little lateral flow. When the water has soaked the soil to the approximate depth of the base of the moisture gauge, free water flows into the gutter around the bottom of the tubular housing wall, and then through the aforesaid openings in said wall. The inflowing water accumulates, and rises in the housing, carrying the float upwardly with it. Although some water escapes during this procedure, through the bottom opening in the housing, the inflow rate far exceeds the outflow rate, particularly in the initial flow stages when the ground underneath the housing is still unsaturuated. As the float rises, it carries the float stem upwardly, through the central opening in the top closure of the housing, to bring the upper, brightly colored portion of the stem into view. That portion of the stem thus serves as an indicator to show that the desired amount of water has been added to the soil. The water can now be shut off, after which the liquid gradually drainsn out of the housing, through its bottom opening, to return the float stem into its normally retracted position. As will be apparent, it is unnecessary to pull the gauge out of the ground to "reset" it for use, and it can therefore be left in place through numerous watering cycles.

It is thus a principle object of the present invention to provide a moisture gauge capable of sensing the point at which soil becomes saturated with water to a desired extent and giving visual indication of this.

It is another object of the invention to provide such a gauge adapted for use in a lawn, flower bed, or the like, and capable of being left in position through numerous watering cycles without hinderance to lawn mowing, or other, operations necessary to maintenance of the area.

Still another object of the invention is to provide such a gauge which is barely noticeable when installed for use, and, where noticeable, is sufficiently inconspicuous to blend into its surroundings without spoiling the attractiveness of well-kept grounds or gardens.

Yet another object of the invention is to provide such a gauge of simple and inexpensive construction, and which can be easily cleaned in position for the removal of deposited soil sediment without the necessity of first uprooting it.

Another object of the invention is to provide such a gauge without mechanical parts such as links and springs which can easily become fouled to the point of malfunction in wet, muddy surroundings.

Other objects, features, and advantages of the invention will become apparent in the light of subsequent disclosures herein.

DESCRIPTION OF THE PREFERRED EMBODIMENTS

Figure 1:
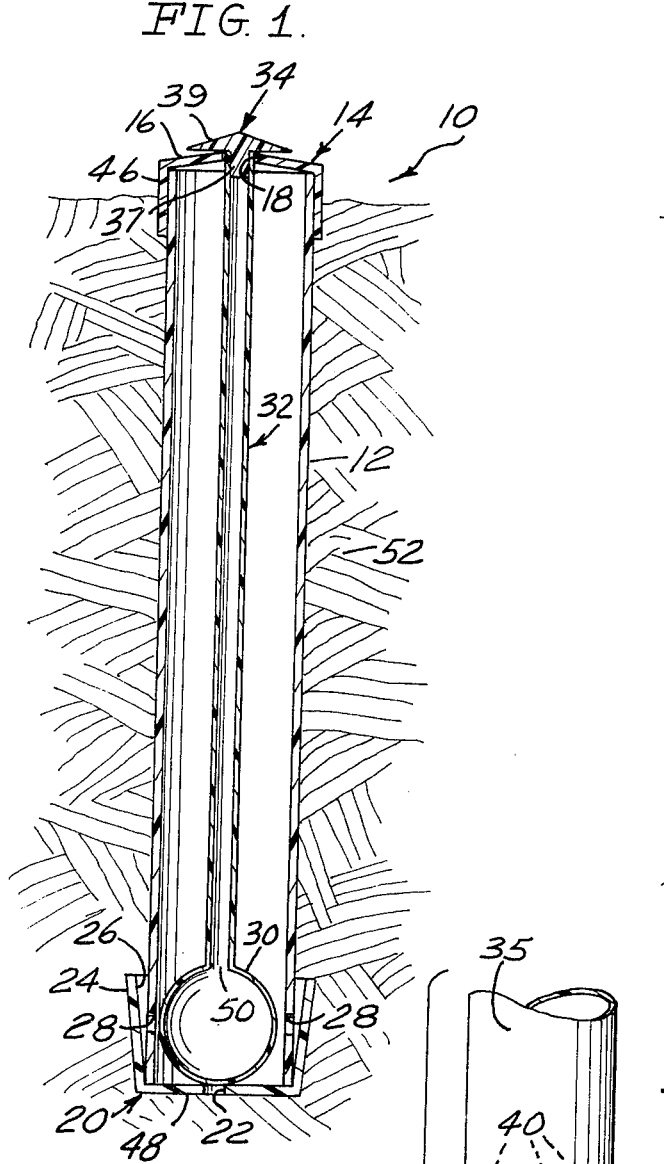
FIG. 1 is a longitudinal sectional view of a preferred form of soil moisture gauge in accordance with this invention in an installed position of use in dry ground.

Considering now the drawing in greater detail, there is shown generally at 10 (in FIGS. 1 and 2) a preferred form of soil moisture gauge according to this invention. The soil moisture gauge is of simple construction, comprising a tubular housing within which is slidably disposed a float 30 to which is fixedly secured a lightweight stem 32. The tubular housing consists of a cylindrical tube 12 having a top cap 14 frictionally fitted to its upper end and a bottom cap 20 fitted to its bottom end. The top cap 14 has a round central opening 18, from which it extends radially outwardly and slopes downwardly, as indicated at 16, to a cylindrical flange 46 by means of which it is friction fitted to the upper end of tube 12 as previously indicated.

The bottom cap 20 of the tubular housing has a flat bottom 48, with a central opening 22, and an integral, slightly frustoconical flange 24 forming a socket smaller at the bottom than at the top for the tube 12, the socket being sized to snugly receive the lower edge of the tube at the bottom of the flange and then diverge slightly outwardly away from the tube wall to define, with said tube wall, an annular gutter 26 at the base of the housing. In that portion of the wall of tube 12 disposed below the top rim of bottom cap 20 there are eight equiangularly spaced openings 28, five of which can be seen in FIG. 2.

Figure 2:
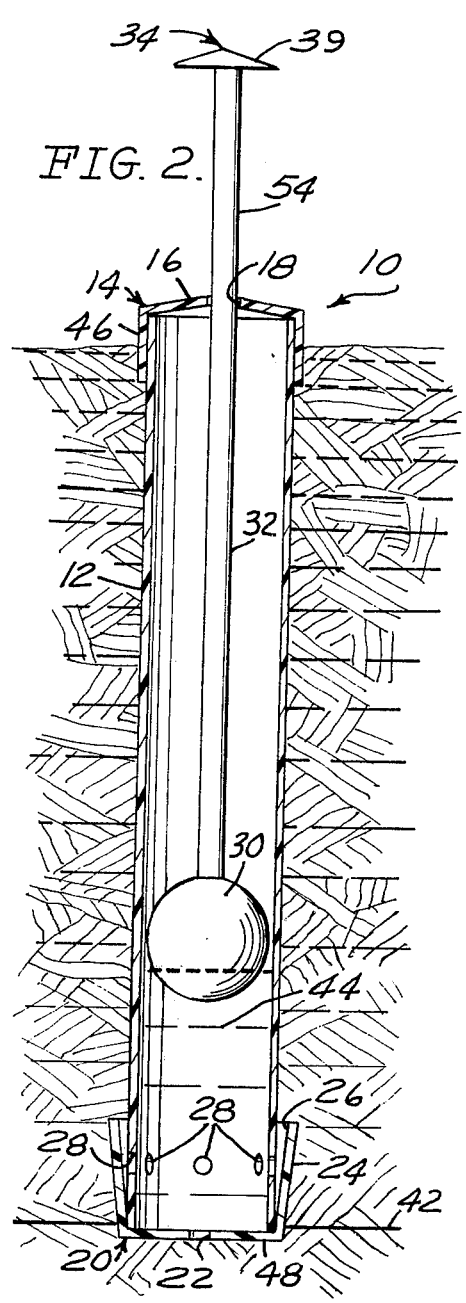
FIG. 2 is another view of the moisture gauge, partly in longitudinal section, as it appears after water has saturated the ground surrounding it to a depth near that of its bottom end.

The float 30 is a hollow plastic sphere and the float stem 32 is a lightweight tubular member of thin-walled plastic construction integrally joined to the sphere, as best illustrated in FIG. 1. The wall of the sphere is uninterrupted, except where there is an opening 50 leading into the hollow interior of the stem (see FIG. 1). The stem 32 is long enough to extend just beyond the opening 18 in the top cap 14 when the float rests on the bottom of bottom cap 20, as shown in FIG. 1. Fitted to the top of the float stem is a lightweight plastic rain cap 34, having a depending plug section 37 sized to fit snugly within the stem as illustrated in FIG. 1. Sphere 30 is of such diameter as to move easily within tube 12 while being guided by the interior tube wall along a substantially straight path and the size relationship between stem 32 and the top cap opening 18 is suth that the stem can move slidingly, without binding, through the opening and be guided by the latter along substantially the same axial path as the float 30, when the float and float stem move up and down within the housing. The rain cap 34 has a conical top surface, as illustrated at 39, and extends outwardly beyond the rin of the top cap opening 18 to keep rain or sprinkler water from entering that opening when the gauge is positioned for use as described below.

The moisture gauge 10 is positioned for use in the ground by first forming a pilot hole of the desired depth in the soil, then inserting the gauge in the hole. The pilot hole can be formed by forcing a round rod or stick of substantially the same cross-sectional size and shape as the gauge into the ground, or by any other suitable method. Preferably, as previously indicated, the pilot hole should be deep enough to receive the gauge to substantially its full length, leaving only a small portion of its top end exposed, as illustrated in FIG. 1. After the gauge has been pressed into the pilot hole, soil is packed around it so that no channels wxist for the downward flow of water adjacent the outer wall of the gauge housing. The moisture gauge is now ready for use, and the soil in which it is implanted can be watered, in any fashion, until the gauge indicated soil saturation to a depth substantially equal to the length of its housing, after which the watering can be stopped. Obviously, the length of the gauge housing can be adjusted as desired for controlling the penetration of water to a depth sufficient for the watering of any normal type vegetation found in gardens, lawns, etc. While watering needs can vary with soil types, plant and grass varieties, and climactic conditions, I have found that a 4- to -6-inch water penetration is generally adequate for lawns growing in loamy soils, and a 12-inch penetration sufficies for rose bushes, shubbery, and the like, growing in such soils. These watering depths can, of course, be achieved through the use of moisture gauges in accordance with this invention of substantially 4- to 6-inch and 12-inch lengths, respectively.

If overhead sprinkling is employed to water the ground or soil (shown at 52) around the implanted moisture gauge 10, the rain cap 34 and sloping top of top cap 14 prevent the entry of incident water into the tube 12 through opening 18 in the top cap. As the water penetrates into the surrounding soil, saturating it layer by layer, it eventually saturates the soil to the depth of the gutter 26 around the base of said tube. After soil becomes saturated, any additional water added flows downwardly at a relatively fast rate to the bottom of the saturation zone, at which level its rate of flow slows perceptibly as it saturates the soil particles in the next deeper layer. Consequently, when soil 52 is saturated to the depth of gutter 26, some of the additional water from the sprinkler flows downwardly around the tubular housing, and into said gutter, from whence it flows through openings 28 in tube 12 to the interior of said housing. As previously indicated, the water cannot flow through bottom opening 22 at a rate equal to that at which it enters the housing, and there is thus an accumulation of inflowing water in the housing which rises as a column in tube 12 and carries float 30 upwardly, When this occurs, the float stem 32 rises and a portion of its upper length is exposed, as illustrated at 54 in FIG. 2, which shows the saturation depth of the soil surrounding the moisture gauge at 42, and the rising column of liquid in the tube at 44. For optimum visual effect, the upper portion of the outer surface of stem 32 can be given a highly visible color, such as, for example, lime green. When this float stem is observed to rise, the sprinklers can be stopped with assurance that the ground has been soaked to the desired depth for good watering purposes.

It is possible, of course, for the openings 28 around the bottom of tube 12 to become at least partially clogged with soil sediment, particularly where the adjacent soil is other than sandy. To clear these openings of sediment, it is necessary only to rotate the tube 12 in bottom cap 12, and this can be done without removing the moisture gauge from the ground. Also, the moisture gauge can be cleaned by back-washing with a hose, simly by removing top cap 14 and taking the float and float stem out of the gauge housing while leaving the tube buried in the ground.

Tube 12, top cap 14 and bottom cap 20 are of plastic construction. Any or all of these parts could, however, be of suitable metallic, or other, construction, if desired, within the scope of this invention. The preferred material of construction for the bottom cap 20 is a relatively resilient plastic of a type resistant to alkalis and acids, such as, for example, polyethylene. Tube 12 should be fairly rigid, to permit is ready insertion in a pilot hole, and also formed from a material resistant to alkalis and acids (as well as to the action of sunlight, since its top is exposed in use) a preferred material for the purpose being polyvinyl chloride (PVC). Top cap 14 is preferably formed from plastic of a type resistent to fading when exposed to sunlight, such as, for example, a vinyl plastic. Float 30 can be a converted hollow plastic fishing float, and float stem 32 a section of plastic straw. Thinness of wall is particularly desirable in the float stem to assure a float stem assembly of minimal weight for sensitive gauge performance.

Tube 12 is preferably formed from standard one-inch OD PVC tubing, the wall of which is about 1/16-inch thick. Where tube 12 is of this diameter, float 30 is preferably of ¾-inch diameter. This leaves a clearance of about 1/16 of an inch between the inner tube wall and the float, which is adequate to permit guided movement of the float in the tube with minimal risk of jamming due to the presence of soil particles or sediment. Bottom cap 20 can be a standard cap for use with 1-inch OD plastic tubing, since such a standard cap has a flange which diverges outwardly from its base to a sufficient extend to provide the gutter 26. The openings 28 around the base of tube 12 are situated below the upper edge of the flange of the bottom cap so that the flange not only helps to devine the gutter 26, but serves as a barrier to keep soil sediment out of the openings to a large extend. While the openings 28 and opening 22 in the bottom cap 20 can vary in size, within reasonable limits, I have found openings of ⅛-inch diameter each to be completely satisfactory for my purpose. Top cap 14 can be of any color, although green is preferred, in most cases, to render the cap as inconspicuous as possible, particularly where it is to be used amid green surroundings, as in a lawn.

Figure 3:
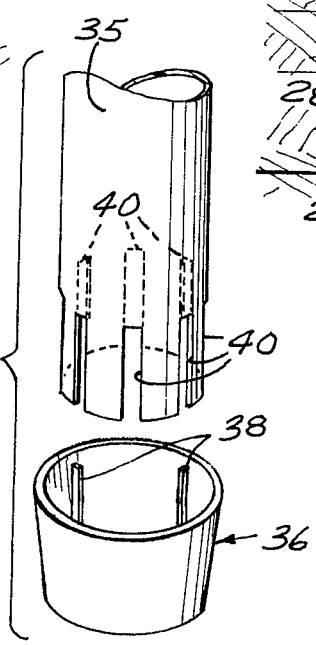
FIG. 3 is a fragmentary perspective view of the bottom end of a housing of an alternative form of the soil moisture gauge, showing a removable bottom closure for the housing separated from the remaining part of the housing for better illustrative effect.

FIG. 3 shows the lower end of a housing tube 35, and a bottom cap 36, forming parts of a second embodiment of a moisture gauge within the scope of this invention. This second embodiment differs from moisture gauge 10 in having a bottom cap with four radially inwardly directed flexible fins 38, two of which can be seen in FIG. 3, integrally affixed to the inner surface of the flange of the bottom cap, and eight complementary slots 40 at the base of tube 35. The fins 38 and slots 40 are equiangularly positioned around a common axis so that when any one of the fins is opposite any one of the slots, each of the other fins is opposite a separate one of the slots. The fins 38 are thin and flexible enough so that when they are out of register with a slot 40, they are folded flat between the flange of bottom cap 36 and the outer wall of tube 35. The function of the fins is to periodically clear slots 40 of any accumulated sediment or soil particles, this being accomplished by rotation of tube 35 similarly to the way tube 12 is rotated for cleaning purposes as previously described herein. Between periods of cleaning, the gauge will normally be positioned with fins 38 out of register with slots 40 to leave the slot openings clear for most effective operation of the gauge. Bottom cap 36, similarly to bottom cap 20 of moisture gauge 10, is a standard plastic cap of suitable size to fit properly onto the end of tube 35, the tube and cap being preferably of the same plastic construction and overall dimensions, as their counterparts in moisture gauge 10.

While my novel soil moisture gauge has been herein described and illustrated in what I consider to be the preferred embodiments, it will be appreciated by those skilled in the art that my invention is not limited to those particular emodiments, but is broad enough in concept to encompass all modifications thereof incorporative of the structural and functional essence of the invention as taught herein. Certain of these modifications have already been mentioned, and others will occur to those skilled in the art in the light of present teachings. Exemplary of the latter are such non-critical variations of the shapes, sized and relative positions of the parts or features of either of the illustrated embodiments as the elimination of certain feature of either of these embodiments not critically essential to its proper use and functioning; the inclusion of various features not essential to the proper use and functioning of the soil moisture gauge; etc. More specific examples of such modifications include soil moisture gauges with floats of different construction than float 30 (such as, for example, cork or syyrofoam floats of other than spherical shape, float assemblies having more than one float element, etc.); moisture gauge with float stems fitted with O-ring seals properly positioned to seal the stem openings in their top caps against the inflow of incident moisture in lieu of rain caps; moisture gauges with telescoping housing tubes and/or float stems which can be adjusted to measure water penetration to differing soil depths; moisture gauges with water entry holes and/or drain holes of other than round shape and disposed in different positional relationship than their counterpart holes in moisute gauge 10; moisture gauges with tube marked to indicate variable depths to which they can be inserted in the ground; and moisture gauges with housing tubes and bottom closures injection molded as integral pieces (which are, in some respects, superior to housings with removable bottoms because of the ease with which they can be removed, intact, from the ground).

Other specific examples of variant forms of my foil moisture gauge not specifically illustrated herein but within the scope of my invention include gauges similar to moisture gauge 10 except with separate, rather than joined, float and float stem members. One such moisture gauge could, for instance, have a stem slidably guidable at its upper end in an opening in a top cap similar to opening 18 in top cap 14 of moisture gauge 10, and slidably guidable at the bottom by stem guide means attachable or intergrally attached to saidstem so as to extend laterally outwardly therefrom in a manner to provide guidance of the stem with in the tubular housing of the gauge similar to the guidance provided for stem 32 by float 30 of moisture gauge 10. In a gauge of this type, the float would be disposed below the stem in the tubular housing and provide flotation support for the latter to cause it to rise and fall with changing water levels in said housing.

In still another embodiment of a moisture gauge having separate float and float stem parts, the tubular housing could be provided with a radially inwardly extending removable or permanently attached stem guide shaped to define a central opening for slidable accommodation of the gauge stem as it moves up and down under the influence of a detached float disposed therebelow similarly to the way the float is disposed below the separate stem of the gauge described just above. In the present version of the gauge, the stem could, and preferably should, have laterally outwardly extending glange or lip means at is bottom end to serve as stop means for the prevention of upward movement of the stem past its guide opening. The stop means could, of course, be sized and shaped similarly to the stem guide means of the gauge just previously described, but would preferably, in accordance with good design practice, be of the smallest size commensurate with proper functioning of the gauge.

Although I have herein stressed the applicability of the novel soil moisture gauge of this invention for use in giving a visual signal when irrigation water has reached a predetermined soil depth, it should, of course, be understood that the gauge has broader use potential than this, and can be employed in any capacity for which its unique character and capabilities suit it. For example, it can be used in conjunction with electrical contact means to control an automatic water sprinkling sytem. Or, it can be used to obtain information on underground water table levels.

Finally, it is emphasized that the scope of the present invention includes all variant forms thereof emcompassed by the language of the following claims.

I claim:
1. Liquid level indicating means, comprising:
first means adapted to serve as a tubular housing;
float means adapted to fit loosely within the tubular housing so as to move freely, in a longitudinal direction, therewithin;
stem means adapted for use in attached combination with said float means so as to extend away therefrom;
said first means comprising a tubular body, top closure means for the tubular body, bottom closure means for the tubular body, and gutter means adapted to form a liquid receiving gutter around the base of said tubular housing;
said tubular body having liquid inlet means near its lower end through which liquid from the gutter can flow into the tubular housing when the liquid level indicating means is in a normal position of use, said normal position of use being an upright one in which the tubular housing is buried with its top closure means up and at least partially exposed to view;

said top closure means having an opening adapted to receive said stem means and permit it to move freely therethrough, the float means with stem means attached being positioned within the tubular housing, and said stem means being oriented and sized to extend through said opening at all times when said tubular housing is is said normal position of use;

whereby, when said tubular housing is buried in said normal position of use, liquid penetrating the surrounding burial medium flows into said gutter when it reaches the level of the latter, and from there into the tubular housing, causing said float means to rise and push said stem means upwardly through the opening in said top closure means to give visual indication of the liquid penetration to said level.

2. Liquid level indicating means in accordance with claim 1 in which said tubular body is of cylindrical shape and said top closure means is a cap for said tubular body.

3. Liquid level indicating means in accordance with claim 2 in which said liquid inlet means near the lower end of said tibular body comprises a plurality of circumferentially spaced holes in the wall of the tubular body.

4. Liquid level indicating means in accordance with claim 3 in which said bottom closure means has a central opening of smaller area than the combined areas of said plurality of holes circumferentially spaced around said tubular body so that liquid entering the tubular housing from said gutter during normal usage of said liquid level indicating means drains therefrom, but at a slower rate than it enters, whereby the entering liquid rises within said tubular body to lift the float and stem means and thereby give visual indication of said liquid penetration to the level of said gutter, and when liquid ceases to flow into said gutter, that remaining within the tubular housing drains away, through the opening in said bottom closure means, to return the float means to its lowermost position and prepare it for subsequent upward movement when liquid again flows into said gutter and the interior of said tubular housing.

5. Liquid level indicating means in accordance with claim 4 in which said float means is a spherical float and said stem means is a light-weight stem with one end fixedly secured to the float so that said stem extends radially away from the surface of the float.

6. Liquid level indicating means in accordance with claim 5 in which the dimensions of the tubular body, spherical float, stem, and the opening in the top closure means are such that the inside diameter of the tubular body and said opening guide the float and stem through a pathway substantially coaxial with that of the tubular body during operation of the liquid level indicating means.

7. Liquid level indicating means in accordance with claim 6 in which the top of the top closure means slopes downwardly away from said opening therein and which includes protective means associated with said stem for preventing the entry of incident water into said tubular housing through the space between sais stem and the edge of said opening in said top closure means.

8. Liquid level indicating means in accordance with claim 7 in which said protective means comprises a shelter cap attached to the top of said stem with a top surface sloping radially downwardly from its center and extending far enough to cover said space between the stem and opening, and in which said shelter cap serves conjunctively with the downwardly sloping top of the top closure means to drain incident water which would otherwise flow through said space away therefrom.

9. Liquid level indicating means in accordance with claim 2 in which said liquid inlet means at the bottom of said tubular body comprises a plurality of parallel slots around the base of said body, and in which said bottom closure means and gutter means together comprise a second cap for said tubular body, said second cap having a slightly outwardly diverging flange and being fitted with flexible fins which extend radially inwardly from the inner surface of said flange, said slots and said find being respectively sized and positioned so that the rotation of said tubular body alternately brings each fin into position to enter and clean a separate one of said slots and out of register with any of said slots, whereby said slots can be cleaned of sediment without removing said liquid level indicating means from its buried position by merely rotating the tubular body in said second cap.

10. Liquid level indicating means in accordance with claim 9 in which the number of said parallel slots is eight and the number of said fins is four, the fins being spaced to enter every other slot when said tubular body is turned so that any fin is in register with any slot.

11. Liquid level means, comprising:

first means adapted to serve as a tubular housing;

float means adapted to fit loosely within the tubular housing so as to move freely, in a longitudinal direction, therewithin;

stem means adapted for use in cooperation with said float means in a manner to extend away therefrom;

said first means comprising a tubular body, top closure means for the tubular body, bottom closure means for the tubular body, and gutter means adapted to form a liquid receiving gutter around the base of said tubular housing;

said tubular body having liquid inlet means near its lower end through which liquid from the gutter can flow into the tubular housing when the liquid level indicating means is in a normal position of use, said normal position of use being an upright one in which the tubular housing is buried with its top closure means up and at least partially exposed to view;

said top closure means having an opening adapted to receive said stem means and to permit it to move freely therethrough, the float means being positioned within the tubular housing, and said stem means being oriented and sized to extend through said opening at all times when said tubular housing is in said normal position of use;

whereby, when said tubular housing is buried in said normal position of use, liquid penetrating the surrounding burial medium flows into said gutter when it reaches the level of the latter, and from there into the tubular housing, causing said float means to rise and push said stem means upwardly through the opening in said top closure means to give visual indication of the liquid penetration to said level.

* * * * *